United States Patent [19]

Kaule et al.

[11] 4,451,530
[45] May 29, 1984

[54] SECURITY PAPER WITH AUTHENTICITY FEATURES IN THE FORM OF LUMINESCING SUBSTANCES

[75] Inventors: Wittich Kaule, Gauting; Gerhard Schwenk, Puchheim; Gerhard Stenzel, Munich, all of Fed. Rep. of Germany

[73] Assignee: GAO Gesellschaft fur Automation und Organisation mbH., Munich, Fed. Rep. of Germany

[21] Appl. No.: 314,843

[22] PCT Filed: May 29, 1981

[86] PCT No.: PCT/DE81/00079

§ 371 Date: Oct. 23, 1981

§ 102(e) Date: Oct. 23, 1981

[87] PCT Pub. No.: WO81/03508

PCT Pub. Date: Dec. 10, 1981

[30] Foreign Application Priority Data

May 30, 1980 [DE] Fed. Rep. of Germany ....... 3020652

[51] Int. Cl.³ .............................. B32B 5/16; G01J 1/42
[52] U.S. Cl. ............................. 428/323; 101/DIG. 25; 428/918; 428/537.7; 428/908; 428/207; 428/333; 428/403; 428/438; 428/464; 428/690; 428/913; 428/916; 428/917; 250/336.11 250/365; 356/71; 162/162; 283/92
[58] Field of Search ............... 428/537, 438, 464, 690, 428/913, 916, 917, 918, 403, 323, 333

[56] References Cited

U.S. PATENT DOCUMENTS

| | | |
|---|---|---|
| 3,447,851 | 6/1969 | Reineika et al. ............. 252/62.57 X |
| 3,455,577 | 7/1969 | Kikumoto . |
| 3,473,027 | 10/1969 | Freeman et al. . |
| 3,525,698 | 8/1970 | Leto et al. . |
| 3,654,463 | 4/1972 | Geusic et al. . |
| 3,928,226 | 12/1975 | McDonough et al. ......... 428/916 X |
| 4,047,033 | 9/1977 | Malmberg . |
| 4,128,674 | 12/1978 | Hedler ............................ 428/403 X |
| 4,146,792 | 3/1979 | Stenzel . |
| 4,152,483 | 5/1979 | Kanda . |
| 4,202,491 | 5/1980 | Suzuki . |

FOREIGN PATENT DOCUMENTS

| | | |
|---|---|---|
| 497037 | 8/1926 | Fed. Rep. of Germany . |
| 667012 | 10/1932 | Fed. Rep. of Germany . |
| 2102120 | 7/1971 | Fed. Rep. of Germany . |
| 1599011 | 2/1972 | Fed. Rep. of Germany . |
| 449133 | 9/1975 | Fed. Rep. of Germany . |
| 2547768 | 7/1976 | Fed. Rep. of Germany . |
| 2754369 | 6/1979 | Fed. Rep. of Germany . |
| EP 31525 | 7/1981 | Fed. Rep. of Germany ...... 428/916 |
| 47-46779 | 11/1972 | Japan ................................. 428/918 |
| 1186253 | 4/1970 | United Kingdom . |
| 1484471 | 9/1977 | United Kingdom . |

*Primary Examiner*—P. Ives
*Attorney, Agent, or Firm*—Schwartz, Jeffery, Schwaab, Mack, Blumenthal & Koch

[57] ABSTRACT

Security papers with luminescing authenticity features worked into them or printed on them. The authenticity features used consist of a luminophore and one or more absorbing materials by which the emission and/or the excitation spectrum of the luminophore is changed in detectable fashion. The dyestuff can be present as an admixture to the luminophore, as a coating of a luminophore layer or as a coating on luminophore powder grains. For checking the authenticity of documents the emission spectrum of the luminophore is not used but the change generated by the technology used in the emission or excitation spectra.

22 Claims, 7 Drawing Figures

SECURITY PAPER WITH AUTHENTICITY FEATURES IN THE FORM OF LUMINESCING SUBSTANCES

BACKGROUND OF THE INVENTION

The invention relates to a security paper with authenticity features in the form of luminescing substances and a process for the manufacture of the same.

Under the description "security paper" are here to be understood banknotes, check forms, shares and stamps as well as passes, credit cards, check cards, passports, air tickets and other certificates and documents.

Making security papers secure against forgery by means of luminescing substances has already been known for a long time. Already in German Patent Specification No. 449133 of the year 1925 and German Patent Specification No. 497037 of the year 1926 the introduction of luminescing substances into security papers is described, wherein the luminophores used therein can be excited with ultraviolet or other invisible rays and emit in the visible region.

In U.S. Pat. Nos. 3,473,027 and 3,525,698 luminophores and their use as coding colors on the basis of host lattices doped with rare earth metals, which if necessary are coactivated, are described, in which the excitation takes place in the UV-region or in the shortwave visible region and the emission in the visible and also in the IR-region bordering thereon, wherein the emissions in the IR-region are employed for broadening the usable spectral region.

The rare earth metal luminophores described in German Offenlegungsschrift No. 2547768 are excited in the IR-region and emit in the visible region.

The use of luminophores for rendering security papers secure is further described in German Offenlegungsschrift No. 1599011.

Starting from the state of the art relevant to rendering security paper secure using luminescing substances it can be concluded that such luminophores are chosen which are available, the unchanged excitation and emission spectra of which appear to be favorable from the point of view of security and authenticity testing.

Furthermore in the patent literature numerous suggestions have been made for modifying luminophores, for example by combination of the same with other substances or their coating and encapsulation for various purposes including changing the spectral region.

Thus it has, for example, been suggested to improve the chemical resistance of luminophores by coating with certain substances. In the case of luminous screens for the multi-colour presentation of images, part of the phosphor is coated with a barrier layer. In the manufacture of high contrast cathode ray tubes for color television receivers it is known to coat the phosphor with pigments.

For improving the image in screen image tubes for color television receivers it is furthermore known to suppress undesired emissions of the phosphor by pigment coating. Concerning this reference can be made for example to German Offenlegungsschrift No. 2754369 and U.S. Pat. No. 4,152,483.

It is also known for example from British Patent Specification No. 1,484,471 to broaden the excitation region of a luminophore by combination with a second luminophore.

In German Offenlegungsschrift No. 2102120 the coating of luminophores with dielectric multiple coatings in order to suppress a part of the emission and simultaneously to increase the intensity of other emissions is described.

In German Offenlegungsschrift No. 1599011 it has already been suggested to cover luminophores which are used for rendering identity cards and the like secure with a foil in order to avoid the security feature being detectable by the naked eye.

Finally it is known from British Patent Specification No. 1,186,253 to cover indicia of luminescing substances partly with dyestuffs impermeable to the emission radiation in order to be able to show up particular indicia such as letters.

Luminophores with characteristic properties which make them suitable for rendering security papers secure for automatic authenticity detection are accordingly restricted in number. This is particularly the case with rare earth metal luminophores which are preferred in use for rendering security papers secure. Most other inorganic and organic luminophores have uncharacteristic broad spectra and are commercially available.

Such broad excitation and emission spectra lead, as for example attention is directed in U.S. Pat. No. 3,473,027, further to the fact that the simultaneous use of more than one single broad band luminophore is not practical.

As discussed above, the known art proposes various methods for changing the spectrum of luminophores. However, these suggestions do not serve to improve the automatic recognizability or automatic ability to differentiate on the basis of luminescence properties. Rather, the art relates to, for example, suppressing the luminescent properties overall, changing the color properties, as in the modification of luminophores for screen tubes, or other purposes.

SUMMARY OF THE INVENTION

The object underlying the invention is to increase the number of luminophores which are suitable as authenticity features for security papers and in particular to create security papers with authenticity features in the form of luminescing substances which are differentiated relative to security papers with known luminophores by a characteristically changed excitation and/or emission spectrum.

The observation underlying the invention is that this problem can be solved in that by combination of the luminescing substance with suitable absorbing materials the excitation and/or emission spectrum is altered in characteristic fashion.

DETAILED DESCRIPTION OF THE PREFERRED EMBODIMENTS

Figure 1:
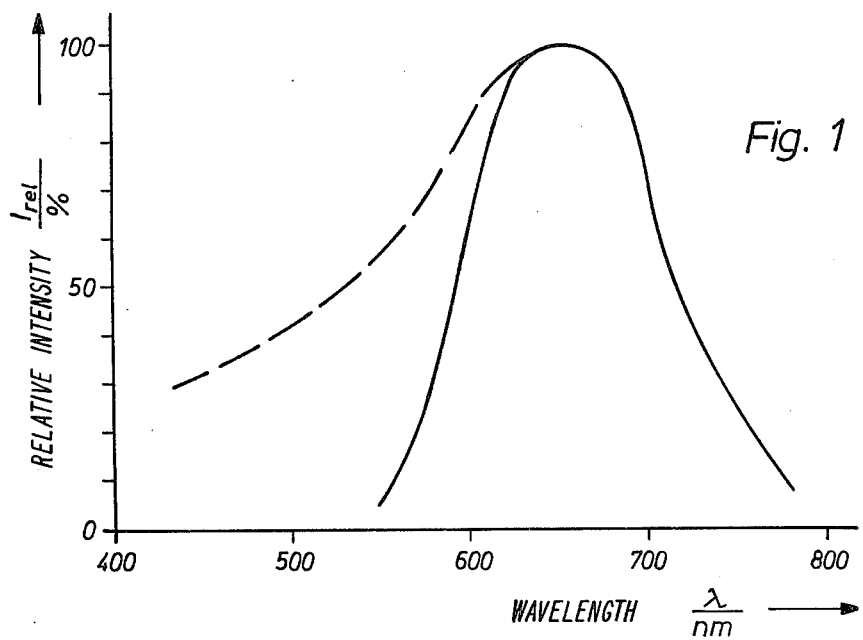
FIG. 1 is a graph representing the emission spectrum according to Example 1.

The subject of the invention is a security paper with authenticity features in the form of luminescing substances which is characterised in that the luminescing substances consist of a luminophore and one or more absorbing materials, wherein the absorption spectrum of the absorbing materials overlaps or covers the emission spectrum or the excitation spectrum of the luminophore and changes it in characteristic fashion.

These changes can for example take place by restriction of the spectral range or also by "deformation" of the excitation and/or emission spectra. The restriction takes place in this connection in the simplest fashion by separation of edge regions of the spectra, while the "deformation" e.g. can take place by desired damping of narrow spectral regions of broad band spectra or by the elimination of given spectral lines.

The characteristic differences between the spectra of the luminophores and those of the luminescing authenticity features made according to the invention can be detected by measuring techniques.

In this way it is achieved that the number of luminescence features which are suitable for automatic authenticity testing and which can be differentiated one from another can be substantially increased as well as features with characteristic spectra prepared.

The rare earth metal luminophores particularly suitable for rendering security papers secure have generally several excitation and emission ranges or bands or lines. By combination with suitable absorbing materials a part of the excitation and emission regions can be suppressed. In this fashion from a single rare earth metal luminophore a large number of different security substances can be manufactured which can be unambiguously distinguished from one another and also from other similar substances.

From broad band luminophores which are unsuitable for rendering security paper secure because the spectra are too uncharacteristic or because the materials are commercially available, feature substances can be made by combination with absorbing materials which have spectra which are characteristic and which can be differentiated from commercially used materials.

In automatic authenticity testing of security papers there is an additional security factor if the security feature shows no emissions in the visible spectral region and accordingly is "non-visible". In the case of luminophores which have such an undesired emission in the visible region, according to the invention the visible luminescence can be avoided in that the luminophore can be combined with an absorbing material which absorbs at least in the region of visible emission of the luminophore.

Even the determination of a luminophore present in a security paper as an authenticity feature would in the case of the security papers according to the invention not yet give the desired result, since the pure luminophore shows other spectra than the combination of luminophore and absorbing material in the security paper.

In the security papers according to the invention the security consists of a luminescing and absorbing component.

The luminescing component can be a known luminophore suitable for rendering the security paper secure but can also be a luminophore which is commercially common and accordingly as such not suited for rendering security papers secure. Excitation and emission of the luminophore can lie in the visible region. Preferably features are to be used, the emission of which is located in the non-visible spectral region.

As absorbing components there are in question in particular dyestuffs, dye additives, such as IR-or UV-absorbers, and other absorbing substances which can be introduced without difficulties during the manufacture of the security paper.

Both components can be organic or inorganic substances which can be introduced in dissolved form or as an insoluble powder.

The suppression of undesired emissions, particularly in the visible region, can take place by the use of absorbing substances which absorb in each wavelength region in which the luminophore gives an undesired emission. For this purpose there are suited in particular dyestuffs and color pigments. Preferably the luminophores are coated with the absorbing substances.

In particular in the security papers according to the invention those luminophores are introduced which are solvent fast and which fit all the resistance tests prescribed in relation to bank note colors. With less high requirements for resistance however naturally also other materials can be used which do not fulfil all of these normal requirements in bank note manufacture.

The luminophores can be, for example, coated with the absorbing substances added to the printing ink. Alternatively the luminophore can be introduced in admixture with the absorbing substance into the printing ink or can be introduced into the paper or can be applied on a security thread foil. The absorbing material can, if desired, be present dissolved in a varnish. Further there is the possibility of coating the printed image which has been made with a printing ink containing the luminophore with the absorbing substance e.g. by means of a second printing process.

The invention is subsequently explained with respect to Examples.

EXAMPLE 1

Methylene Blue was used as luminescing substance. The excitation spectrum of this dyestuff is comparatively uncharacteristic.

In FIG. 1 the excitation spectrum of Methylene Blue is reproduced by the dashed line, which from 530 nm to greater wavelengths is overlapped by the continuous line.

A translucent security foil was first coated with Methylene Blue which was dispersed in a foil printing varnish at a coating thickness of 20 $\mu$m. The luminescing foil so obtained was then over-printed with the dyestuff Permanent Red R extra (from the firm of Hoechst AG) which was dispersed in a gravure printing varnish. By means of this overprinting the excitation spectrum changed in the fashion schematically illustrated in FIG. 1. The excitation spectrum of the combination of Methylene Blue with Permanent Red R extra is in this case shown as a continuous line in FIG. 1.

EXAMPLE 2

200 g Lumilux CD 118 (from the firm of Riedel de Haen), 60 g isophorone diisocyanate, 34 g toluenesulphonamide, 20 g melamine and 8 g Light Blue 2R (from the firm of Bayer AG) were mixed in a heatable kneader at 140° C., wherein by means of exothermic reaction with an increase in temperature to 200° C. a brittle solid body resulted. The product was polymerised out for a further 30 minutes at 180° C. and then milled.

Figure 2:
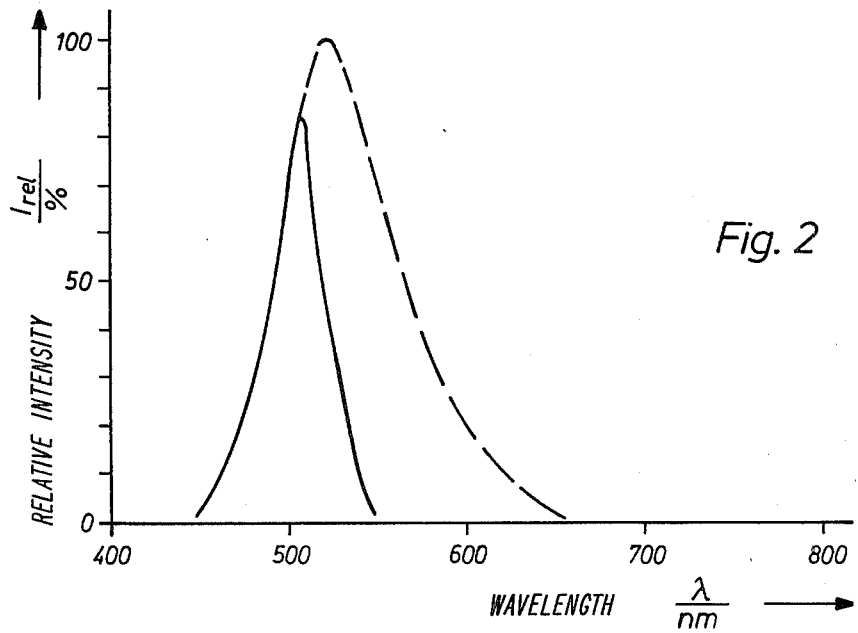
FIG. 2 is a graph representing the emission spectrum according to Example 2.

A blue coloured pigment was obtained. On excitation with UV-radiation of 365 nm the pigment showed an emission spectrum as is represented in FIG. 2 in the form of the continuous line. Compared to the emission spectrum of Lumilux CD 118 (firm of Riedel de Haen) which is reproduced as a dashed line in FIG. 2, the spectrum is characteristically altered.

EXAMPLE 3

A pigment was manufactured as described in Example 2, wherein however 1 g of the azo dyestuff Orange II was used in place of 8 g Light Blue 2R.

Figure 3:
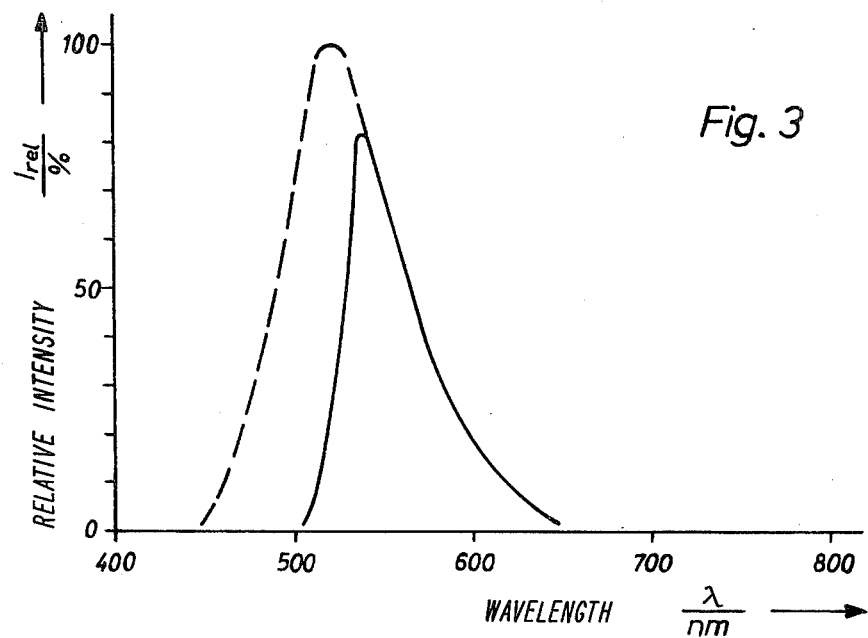
FIG. 3 is a graph representing the emission spectrum according to Example 3.

An orange colored pigment was obtained the emission spectrum of which on excitation with UV-radiation at 365 nm is represented in FIG. 3 as a continuous line and which is characteristically differentiated from the emission spectrum of Lumilux CD 118 (firm of Riedel de Haen) shown in dashed line in FIG. 3.

EXAMPLE 4

215 g Yttrium oxide $Y_2O_3$ were intimately mixed with 19.3 g thulium oxide $Tm_2O_3$ and 234 g ammonium metavanadate $NH_4VO_3$ and the resulting mixture heated in air for 2 hours to 800° C. The thulium-activated yttrium vanadate obtained had the composition $Y_{0.95}Tm_{0.05}VO_4$. The product was milled to a particle size of 2 $\mu$m.

On excitation with UV-radiation of 310 nm the luminophore showed strong narrow band emissions at 480 nm and 800 nm. This luminophore was embedded according to Example 2 together with the dyestuff Permanent Red R extra (from the firm of Hoechst AG) in a synthetic resin.

Figure 4:
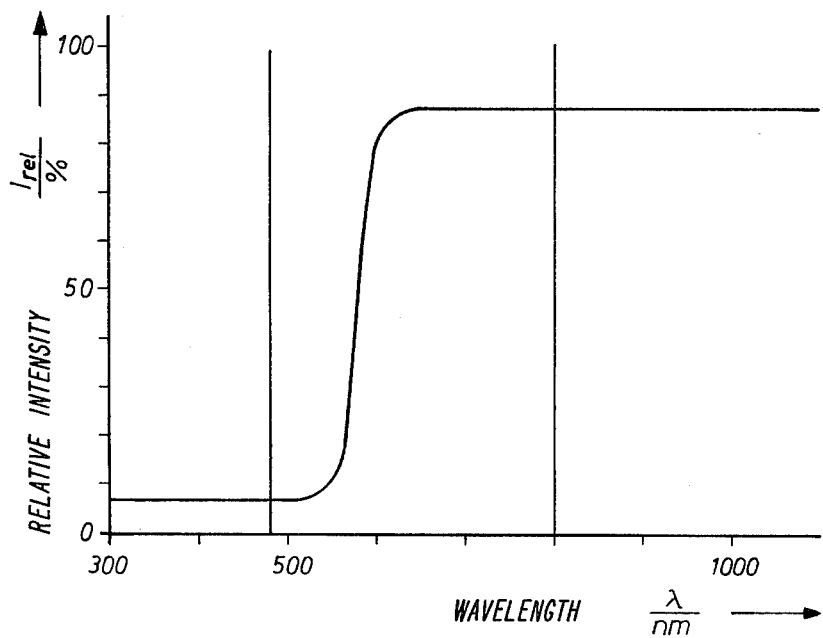
FIG. 4 is a graph representing the emission spectrum according to Example 4.

In FIG. 4 the remission spectrum of the dyestuff Permanent Red R extra is reproduced. Also drawn thereon are the narrow band emissions of the luminophore. By means of the combination of luminophore and dyestuff the emission at 480 nm is suppressed and only the emission at 800 nm can be observed.

EXAMPLE 5

Example 4 was carried out again but wherein instead of the dyestuff Permanent Red R extra the dyestuff Hostaperm Green 8G (from the firm of Hoechst AG) was used.

Figure 5:
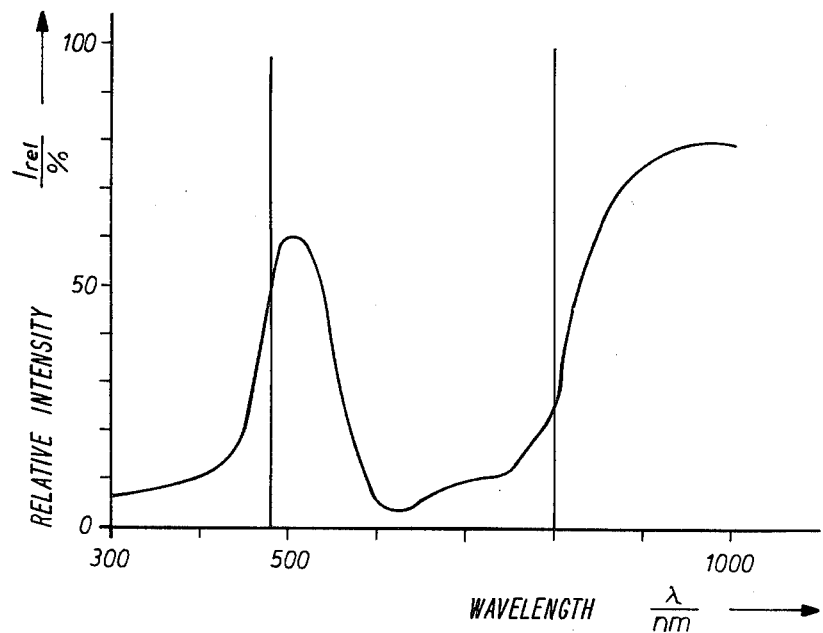
FIG. 5 is a graph representing the emission spectrum according to Example 5.

In FIG. 5 the remission spectrum of Hostaperm Green 8G is reproduced together with the emission lines of the luminophore $Y_{0.95}Tm_{0.05}VO_4$. (Thulium-activated yttrium vanadate). By the combination of the luminophore with the dyestuff the emission at 800 nm is suppressed and only the emission at 480 nm can be observed.

By comparison of the FIGS. 4 and 5 it is furthermore evident that from the luminophore used by combination with suitable dyestuffs two luminophores characteristically differentiated with respect to their emission spectra can be prepared.

EXAMPLE 6

94 g Calcium carbonate $CaCO_3$ and 5.8 g thulium oxide $Tm_2O_3$ were dissolved in hydrochloric acid HCl. The pH was adjusted to 10 with caustic soda NaOH and precipitation effected with an aqueous sodium tungstate solution. The resulting mixed tungstate was mixed with 120 g sodium tungstate $Na_2WO_4$, transferred into a crucible of aluminium oxide and calcined for 4 hours at 1100° C.

After cooling the fluxing agent was washed out with water.

A white powder of composition $Na_{0.03}Ca_{0.94}Tm_{0.03}WO_4$ with an average particle size of 2 $\mu$m was obtained.

This thulium-activated calcium tungstate has on excitation with UV-light a blue luminescence at 480 nm as well as luminescences in the IR at 800 and 1700 nm.

The luminescences at 480 and 800 nm can be suppressed by combination with suitable absorbing dyestuffs, namely for example Milori Blue (from the firm of Langer, Ritterhude).

Since the luminescence at 1700 nm lies in the central IR-region in which the organic dyestuffs in general are translucent, most dyestuffs and many pigments can be used to suppress the emissions at 480 and 800 nm. The dyestuffs and pigments to change the excitation spectrum are to be chosen correspondingly.

EXAMPLE 7

21.4 g Yttrium oxide $Y_2O_3$, 1.7 g europium oxide $Eu_2O_3$ and 23.4 g ammonium metavanadate $NH_4VO_3$ were mixed and milled to a particle size of 3 $\mu$m. The mixture was then sintered in a platinum tray for 1 hour at 730° C. and thereafter cooled to room temperature. The product was milled yet again and again heated for 1 hour at 730° C.

The resulting europium-activated yttrium vanadate $Y_{0.95}Eu_{0.05}VO_4$ was a homogenous powder with an average particle size of 2 $\mu$m.

The luminophore showed on excitation with UV-light at 313 nm an emission at 618 nm. The emission at 618 nm showed however also on excitation in the region of 590 to 615 nm.

The powder grains were coated with a synthetic resin which contained 2,4-dihydroxybenzophenone. The product so made showed on UV-excitation no luminescence but on excitation in the region of 590 to 615 nm a luminescence at 618 nm.

EXAMPLE 8

500 g of the thulium-activated yttrium vanadate made in Example 4 $Y_{0.95}Tm_{0.05}VO_4$ were milled together with 1.8 g Cadmium Red (registered Trade Mark of Farbenfabrik Siegle u. Co) in 500 ml water in a stirring ball mill. To this pigmentluminous material mixture was added 0.6 g (solids content) of an emulsion consisting of 94% ethyl acrylate and 6% acrylic acid and then 2 g (solids content) of an emulsion consisting of 45% ethyl acrylate, 52% methyl methacrylate and 3% dimethylaminoethyl methacrylate.

Thereafter the pH of the system was adjusted with acetic acid to 4. The luminous material coated with Cadmium Red was filtered, washed with water and dried.

This luminophore shows still only a narrow band emission at 800 nm. The blue fluorescence at 480 nm is totally suppressed.

EXAMPLE 9

250 g of ytterbium-activated yttrium vanadate $Y_{0.95}Yb_{0.05}VO_4$ made according to Example 8 were milled with 1.2 g Indanthrene Brilliant Orange GR (Farbwerke Hoechst) and 2.5 g tetraethylene glycol dimethacrylate in 300 ml benzene in a stirring ball mill. After filtering off the powder was dried in vacuo and then suspended with vigorous stirring in mineral oil. This suspension was heated for 4 hours to 110° C., whereby polymerisation of the monomer occurred.

The orange red luminous pigment resulting was filtered off, washed with hexane and dried. On UV-excitation the product so made showed no luminescence but on excitation in the region of 940 nm a luminescence at 985 nm.

The testing device (FIG. 6) consists of an illumination part 4 and a detector part 5. The security paper 1 to be tested in brought by means of a transport device here not illustrated above the window 3. From the window falls excitation light on to the security paper, which originates from illumination units 6, 7 and 8. These illumination units consist in each case of a lamp 9, preferably a xenon flash lamp and lens 10, which allows the light to pass parallel through the interference filters 11; these filters allow the excitation to be restricted to desired spectral regions. In the case that the characteristic change effects only the emission spectrum, then one can if desired do away with two of the three illumination units, 6, 7 and 8.

The excitation light is guided by means of beam splitters 15, 16 to a collecting lens 12 and through this focussed on to the security paper.

The intermediate walls 13 take care of suppressing stray light.

The luminescence light which is emitted from the luminescing substances with which the security paper is provided is directed parallel by means of the collecting lens 14 and guided by the beam splitters 18 and 19 on to the interference filters 11. By means of these the emission spectrum is split up into several non-overlapping channels.

A generally comparatively narrow band width channel directly receives the characteristic part of the emission spectrum changed by the combination with the absorbing material; for example it is measured via the detector unit 17. Both the other detector units 20 and 21 receive in comparatively broad band fashion the spectral regions of the emission spectrum bordering on the characteristic part.

Figure 7:
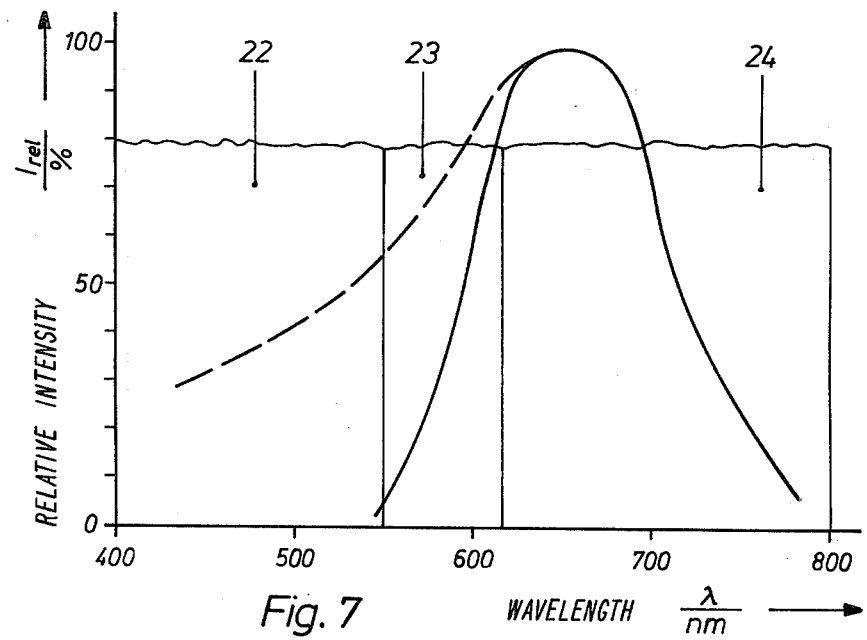
FIG. 7 is a graph illustrating the use of the testing device of FIG. 6.
Figure 6:
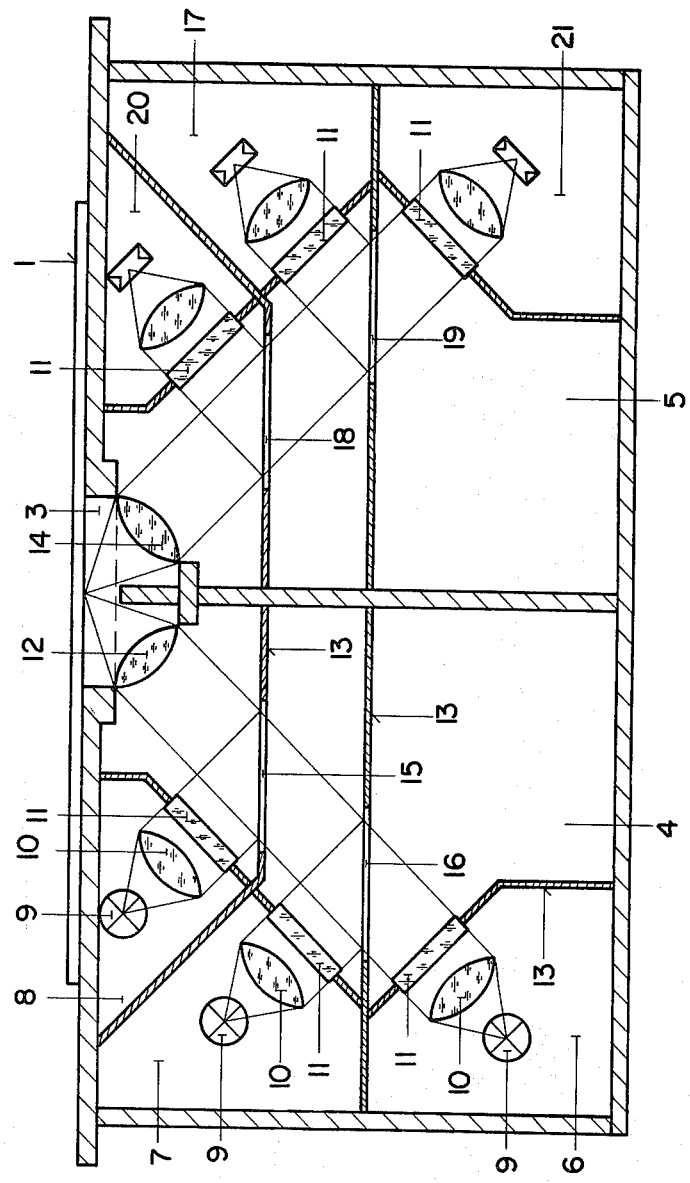
FIG. 6 is a schematic illustration of a testing device according to the present invention.

From the excitation spectra of Methylene Blue drawn in FIG. 7 with (continuous line) and without coating (dashed) it is obvious that by means of the ratio of the values measured in the individual channels 22, 23, 24, which correspond to the illumination units 6, 7 and 8 shown in FIG. 6, a luminescing substance according to the invention can be identified with certainty. Obviously with correspondingly high requirements for the identification of a substance according to the invention the number of channels can be raised as desired and thereby their spectral width diminished to practically any degree.

In this way one can also fulfil very high requirements for authenticity testing.

What is claimed is:

1. Security document with authenticity features comprising: a substrate material supporting a luminescing substance, having a known emission spectrum and a known excitation spectrum, said luminescing substance comprising a luminophore and an absorbing substance, said absorbing substance having an absorption spectrum which partly overlaps at least one of said known emission spectrum and said known excitation spectrum of the luminophore whereby said luminescing substance has an emission spectrum which is characteristically altered from said known emission spectrum whereby said characteristically altered portion of the spectrum is used for authentication of the security document.

2. Security document according to claim 1, wherein said absorbing material is a dyestuff.

3. Security document according to claim 1, wherein said absorbing material is a pigment.

4. Security document according to claim 1, wherein said absorbing material is an IR-absorber.

5. Security document according to claim 1, wherein said absorbing material is a UV-absorber.

6. Security document according to claim 5, wherein said absorbing material is a mixture containing at least two materials selected from the group consisting of a dyestuff, a pigment, an IR-absorber and a UV-absorber.

7. Security document according to claim 1, wherein said luminophore has an emission spectrum which includes a portion of the visible spectrum and said absorbing material has an absorbing spectrum which includes said portion of the visible spectrum in which said luminophore emits.

8. Security document according to claim 1, wherein said absorbing material has an absorption spectrum which includes the whole visible spectral region and the rear IR.

9. Security document according to claim 1, wherein said luminophore has a known emission spectrum and said absorbing material is optically translucent in each spectral region of said emission spectrum with the exception of the visible spectral region.

10. Security document according to claim 1, wherein said luminophore emission spectrum includes the invisible region of the optical spectrum.

11. Security document according to claim 10, wherein said luminophore emission spectrum includes the infrared region of the optical spectrum.

12. Security document according to claim 1, wherein said luminophore has an excitation spectrum which includes the non-visible region of the optical spectrum.

13. Security document according to claim 10, wherein said luminophore has a broad band emission spectrum.

14. Security document according to claim 13, wherein the luminophore is a laser dyestuff.

15. Security document according to claim 10, wherein the luminophore has a narrow band emission spectrum.

16. Security document according to claim 15, wherein the luminophore is a rare earth metal luminophore.

17. Security document according to claim 1, wherein the luminescing substance is a mixture of the luminophore and the absorbing material.

18. Security document according to claim 1, wherein the luminescing substance comprises a luminophore coated with the absorbing material.

19. Security document according to claim 1, wherein the luminescing substance comprises a luminophore layer coated with the absorbing material.

20. Security document according to claim 1, wherein the absorbing material has an absorption spectrum which overlaps an edge of one of said excitation and emisson spectrums of the luminophore to damp emissions from said luminophore small values in the overlapped region.

21. Security document according to claim 1, wherein the absorbing material has an absorption spectrum which covers a narrow region of one of said excitation and emission spectrums of the luminophore.

22. Security document according to claim 21, wherein the absorbing material has an absorption spectrum which covers lines of at least one of the excitation and emission spectrums of said luminophore.

* * * * *